United States Patent [19]

Covert

[11] Patent Number: 5,177,789
[45] Date of Patent: Jan. 5, 1993

[54] POCKET-SIZED COMPUTER ACCESS SECURITY DEVICE

[75] Inventor: John R. Covert, Acton, Mass.

[73] Assignee: Digital Equipment Corporation, Maynard, Mass.

[21] Appl. No.: 774,705

[22] Filed: Oct. 9, 1991

[51] Int. Cl.⁵ .............................. H04K 1/00
[52] U.S. Cl. ......................... 380/23; 380/25
[58] Field of Search ............... 380/23, 25, 49, 50, 380/10

[56] References Cited

U.S. PATENT DOCUMENTS

| | | | |
|---|---|---|---|
| 4,471,216 | 9/1984 | Herve | 380/25 |
| 4,536,647 | 8/1985 | Atalla et al. | 235/379 |
| 4,599,489 | 7/1986 | Cargile | 178/22.08 |
| 4,720,860 | 1/1988 | Weiss | 380/23 |
| 4,926,481 | 5/1990 | Collins, Jr. | 380/25 |
| 4,972,475 | 11/1990 | Sant'Anselmo | 380/23 |
| 5,058,036 | 10/1990 | Nakasuji et al. | 380/10 |

OTHER PUBLICATIONS

Product Brochure for ACM/5100 Access Control Module, published by Security Dynamics, Cambridge, Mass., 1988.

*Primary Examiner*—Salvatore Cangialosi
*Attorney, Agent, or Firm*—Arnold, White & Durkee

[57] ABSTRACT

A credit-card-sized code-generating device is employed by a user in a computer-access security arrangement. The device has a multi-digit display producing a time-related set of digits, in an X-Y array. The user selects from this X-Y array of digits a multi-digit code based upon a secret code (PIN) memorized by the user. The device may display an array of rows and columns of digits, and the user selects a digit from each row based upon the digits of his secret code, where the column selected corresponds to the value of each digit of the secret code. The array of digits produced on the display is generated within the device by first generating a multi-digit token by some algorithm unique to this user, and using this token to index into a table of sets of display digits, then modifying the digits from the selected set, also based upon digits of the token. In this manner, the code read from the display, i.e., selected from rows and columns of digits based upon the personal password, is encrypted, and will be worthless to an unauthorized user even if the device is stolen.

19 Claims, 4 Drawing Sheets

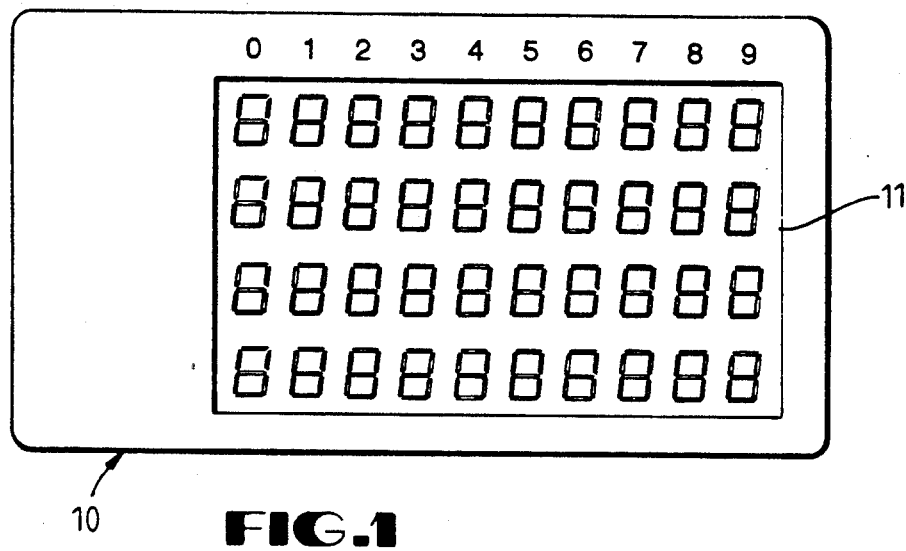
FIG.1
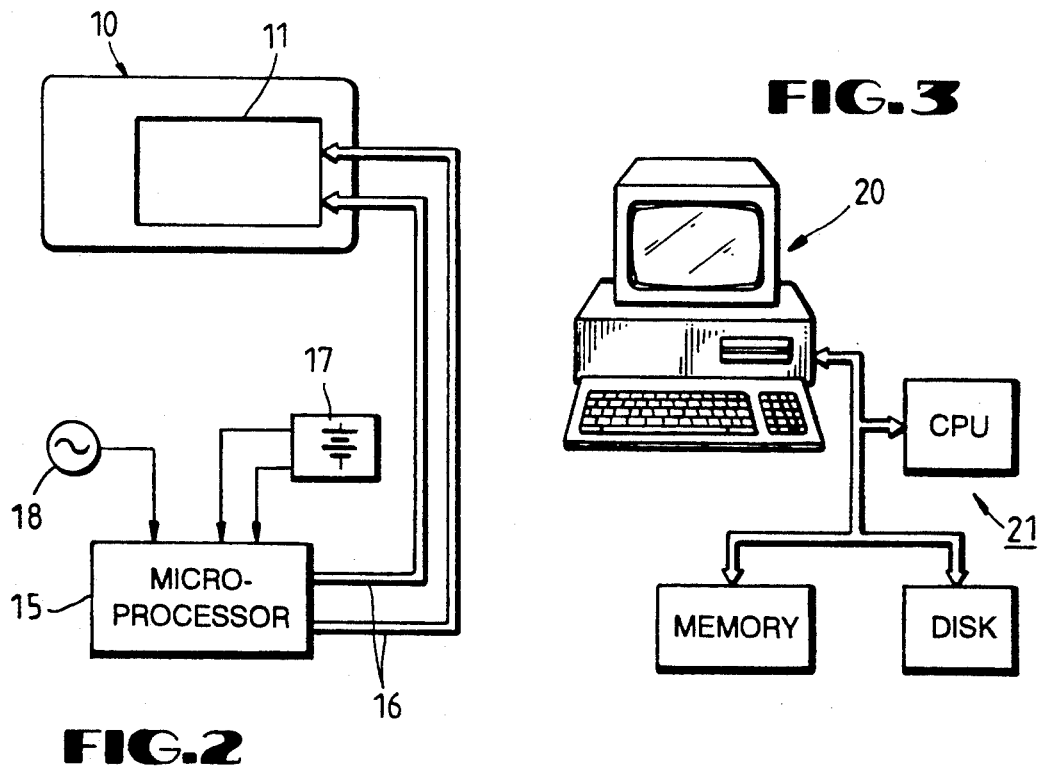
FIG.3
FIG.2

POCKET-SIZED COMPUTER ACCESS SECURITY DEVICE

BACKGROUND OF THE INVENTION

This invention relates to security devices for computer access, and more particularly to a pocket-sized device for generating an encoded password or code for entry into a computer system before access is allowed.

Computer systems of the network or distributed type, or systems having a number of terminals for access, usually require a user to enter some type of password before access is permitted. The user ordinarily first enters a UserName, which in some cases is associated with a particular station, then must enter a password associated with that UserName. The computer system compares the two with its internal store of authorized users to grant or deny access. While this type of protocol is widely used, and provides a good measure of protection, there are many instances of compromise due to various ways of mismanaging the passwords; users often write them in easily-found locations, or choose obvious combinations so they are easily remembered. Passwords can be extracted from the stream of data on a line in a network or distributed system, or can be detected by a committed observer of the keystrokes made by the user. For this reason, various additional security steps have been imposed, such as requiring possession of a device, such as a key or machine-readable card, for example. Even this method can also be compromised by theft of the device combined with discovery of the password of a user. In addition, the hardware which must be appended to the computer terminal to implement the key or card reader is a burden in most environments.

One approach to computer security which adds a measure of protection beyond that provided by a password is disclosed in U.S. Pat. No. 4,720,860, assigned to Security Dynamics Technologies, Inc., (also commercially available as the so-called ACM/5100 Access Control Module). The patent discloses a hand-held, pocket-sized, credit-card-like device for generating a time-related, non-predictable code which is displayed by an LCD display and entered into a computer terminal by a user, along with a secret code such as a password remembered by the user. The time-related, non-predictable code is also calculated by the computer system, so the entered data can be compared to grant or deny access. The advantage of the system of U.S. Pat. No. 4,720,860 is that even if an unauthorized user gets possession of the device, he cannot obtain access to the computer system without the user's password. Or, if he obtains the password and the code entered at a given time, this will be useless at a later time when he attempts to gain access, because the code to be generated by the device will have changed by this time. Also, no additional hardware must be affixed to the computer terminal to implement this security system; the pocket-sized device is free-standing and need not be physically connected to the system. Nevertheless, this type of system can still be compromised by theft of the hand-held device coupled with ferreting the password for a given user, as by detecting the data stream on the computer interconnect channels. That is, the password is entered as plaintext rather than being encrypted. The password could be encrypted by providing a keyboard in the hand-held device so the password can be entered by the user and an encrypting algorithm implemented, producing a code for entering at a terminal along with the time-related non-predictable code. The disadvantages of such an approach using a keyboard include that of requiring a larger device for a user to carry in his pocket, and that of exposing more of the encrypting mechanism to reverse engineering based upon a stolen hand-held device.

It is therefore proposed to provide a computer security device and method in which both an encrypted password and an encrypted time-related code are required for access to a computer system, wherein the information is generated employing a small, easily carried, simple and inexpensive device.

SUMMARY OF THE INVENTION

In accordance with one embodiment of the invention, a credit-card-sized code-generating device is employed which has a multi-digit display producing a time-related set of digits in an X-Y array (many more digits than need be entered as a password). The computer user selects from this X-Y array of digits a multi-digit code based upon a secret code memorized by the user, and enters this multi-digit code into a computer terminal to obtain access to a computer system. For example, the device may display an array of rows and columns of digits, and the user selects a digit from each row in a position based upon the digits of his secret code, where the column selected corresponds to the value of each digit of the secret code. The X-Y array of digits produced on the display is generated by first generating a multi-digit token by some algorithm unique to this user, and using this token to index into a table of sets of display digits, then modifying the digits from the selected set, also based upon digits of the token. In this manner, the code read from the display, i.e., selected from rows and columns of digits based upon the personal password, is encrypted, and will be worthless to an unauthorized user even if the device is stolen. The device is preferably self-contained, needing no connection to the computer terminal.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

FIG. 1 is a front view of a computer-access security device according to one embodiment of the invention;

FIG. 2 is an electrical diagram of the contents of the device of FIG. 1;

FIG. 3 is an electrical diagram of a computer system accessed by the device of FIGS. 1 and 2;

DETAILED DESCRIPTION OF SPECIFIC EMBODIMENTS

Figure 4:
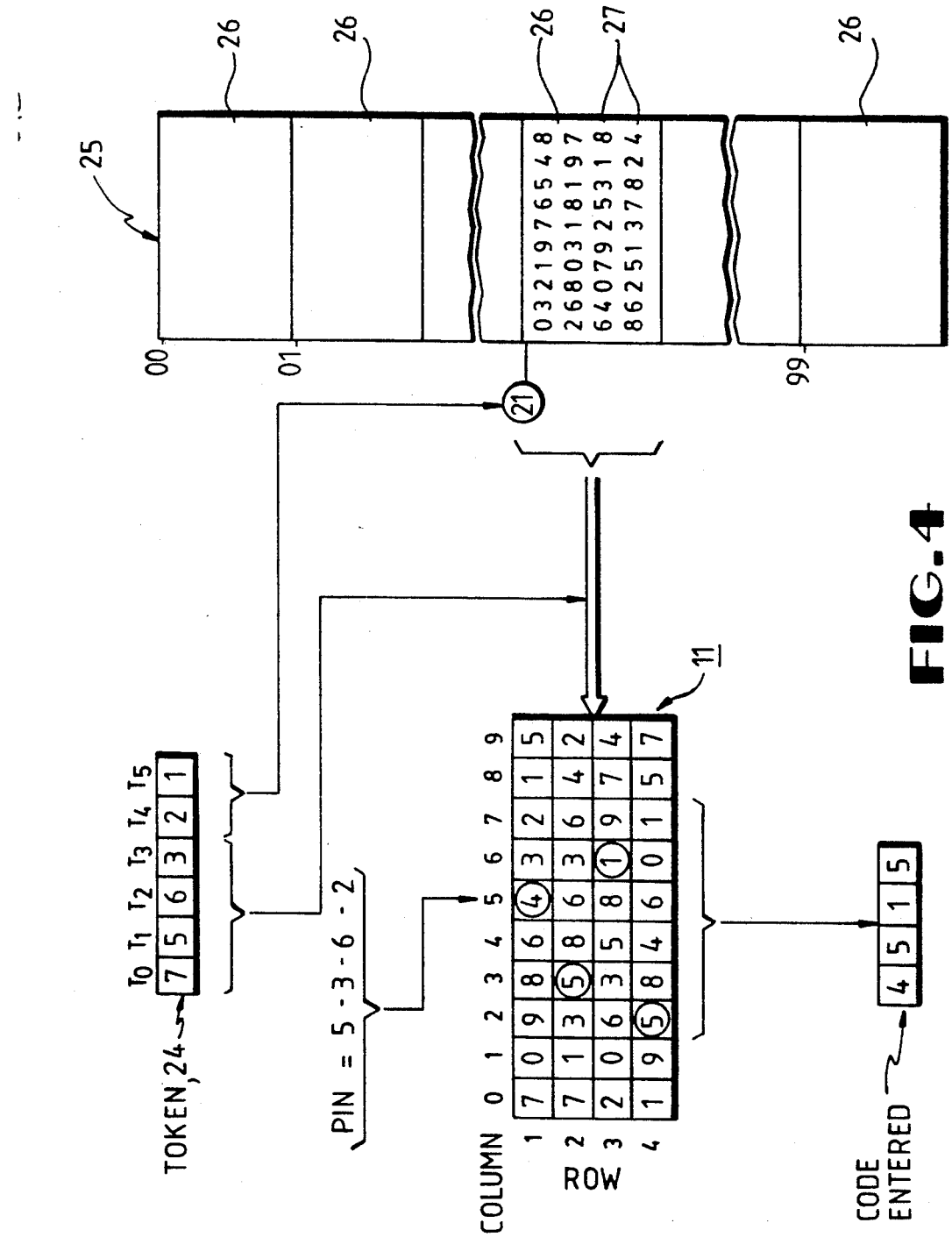
FIG. 4 is a diagram of the method used to generate the code produced by the device of FIGS. 1 and 2, in one example.

Referring to FIG. 1, a computer user carries a pocket-sized "credit-card" shaped device 10 which has a forty-digit LCD display 11, arranged in four rows and ten columns. At any given time, this display is of seemingly random digits, and the set of digits displayed will change at periodic intervals. Using a personal ID number (kept secret by the user) a digit is selected from each row of the display 11 to enter into the computer system as an access code or password, as will be explained. Of course, this 40-digit display 11 is merely an example of a type of display that may be used in a system according to the invention, since a different number of rows (and- /or columns) can be employed, and alphabetical or alphanumeric characters may be used instead of decimal digits. The display 11 may be configured vertically instead of horizontally as it is shown, i.e., four columns and ten rows instead of four rows and ten columns. The number of rows in the display 11 corresponds to the number of digits of a personal password or personal ID, and could be a number other than four.

Inside the thin credit-card-like device 10 is a microcontroller chip 15 as seen in FIG. 2, having lines 16 driving the LCD display 11, with the display being continuously "on." Preferably, there need be no off-on switch. A lithium battery 17 powers the microcontroller chip 15 and the display for many months. Commercially available CMOS chips and low-power LCD displays provide extremely low current drain. Alternatively, an off-on switch may be used for added lifetime before battery replacement is needed. A crystal oscillator 18 is included to provide a time reference; a counter function in the chip 15 accumulates clock pulses to generate a time-day-date standard used to determine when a new code is displayed, and is in sync with the time standard of a central computer.

A user carrying the device 10 of FIG. 1 would also have a UserName assigned to him, as well as a personal ID or PIN (personal identification number) which is the "secret." To gain access to a terminal 20 for a computer system 21 of FIG. 3, the user would first enter his UserName at a prompt at a keyboard of the terminal 20. Then, employing his PIN, the user selects certain digits from the display 11 to enter at the terminal 20 in response to a Password prompt. Alternatively, of course, the UserName may be mechanically entered from the device 10 itself, as by a magnetic reader responsive to a strip on the device 10. Also, even though shown as a computer terminal 20, the entry equipment may be a banking terminal (ATM or automatic teller machine), or an employee entrance gate at a secure facility, for example. Bar code readers, or other photoresponsive technology, may be used at the terminal 20 to identify the device 10 or the user, instead of a magnetic strip or a UserName entry. The terminal may be a telephone device, in which case the code and PIN entry is by a touch-tone mechanism. Preferably, of course, the UserName is entered at a keyboard of the terminal 20 by the user, so that no additional hardware is required for the terminal.

According to one embodiment of the invention, an encrypting method is used to generate the digits of the display 11. The microcomputer 15 periodically generates a token 24 of FIG. 4, e.g., once every minute, in response to the time standard. This token may be a six-digit number, for example, consisting of the six digits $T_0$, $T_1$, $T_2$, $T_3$, $T_4$ and $T_5$ as seen in FIG. 4. This token is computed at the pocket authentication device 10 as well as in the computing system 21, using some suitable algorithm which is kept secret, i.e., not available to the public or casual user. For example, the token may be selected from a table of pseudorandom numbers, may be a cryptographic function of the time of day, or the UserName, or some other function, employing instructions executed by the microprocessor 15. To the public, the token 24 would appear to be a random six-digit number, but this token is never available to the user or to the public.

Four of the digits of the token 24 of FIG. 4 are used to generate the forty digits of the display 11, in conjunction with 100 different display modifiers (forty-digit sets of numbers). These sets of modifiers may be unique to a device 10, or preferably may be one of perhaps a hundred different sets of sets; the computer system 21 must store the identity of which of these sets of 100 is in the device 10 for a given UserName. Two digits $T_4$ and $T_5$ of the token 24 are used to select from a table 25 of the 100 different display modifiers. The table 25 of display modifiers is maintained in memory in the chip 15 (or in an associated ROM or EPROM chip), and may be represented as seen in FIG. 4 as a map of 100 fields 26, indexed by a two digit number obtained from $T_4$ and $T_5$ of the token 24. Each field 26 contains forty digits 27, corresponding to the forty digits of the display 11. The digits used for the display 11 at a given time are generated from the selected field 26 by adding the digits of the token 24 to the digits 27 of the field 26, according to the relationship $$D_{mm} = (T_n + I_{mm}) \text{modulo } 10$$

where
$m = 0 \rightarrow 9$
$n = 0 \rightarrow 3$
and D is the number on the display 11, T is the digit of token 24, and I is the number in the field 26. That is, the numbers of the field 27 are added to the token digits, and the overflow discarded. In the example illustrated in FIG. 4, where the token 24 is 7-5-6-3-2-1, the 21st field 26 is selected by indexing to the value of $T_4$ and $T_5$, and the digits found in the first row of this field are 0-3-2-1-9-etc. For the first row of the display 11, the value "7" ($T_0$) is added to each of the digits 0-3-2-1-9-5-etc., and rounded off, producing the sequence of digits 7-0-9-8-6-4-etc., as shown for the first row of the display 11. The value "5" ($T_1$) is added to each digit of the second row, "6" to the third row, and "3" to the last row.

In the example of FIG. 4, assume the secret or PIN is "5-3-6-2," in which case "4"-the digit under the "5"-is read from the first row for the first digit of the code, the second code digit "5" is under the "3" in the second row, the third code digit "1" is under the "6" in the third row, and the last code digit "5" is under the "2" in the fourth row of the display 11. The code entered by the user is therefore "4-5-1-5" for this example. A different token 24 is generated at the end of the time-out period, so a different field 26 would be used at a later time, and a different set of forty numbers would appear on the display at a different time. Thus, even though the user's PIN stays the same, the code number entered is encrypted to appear as a different number, and this number changes with time.

Figure 5:
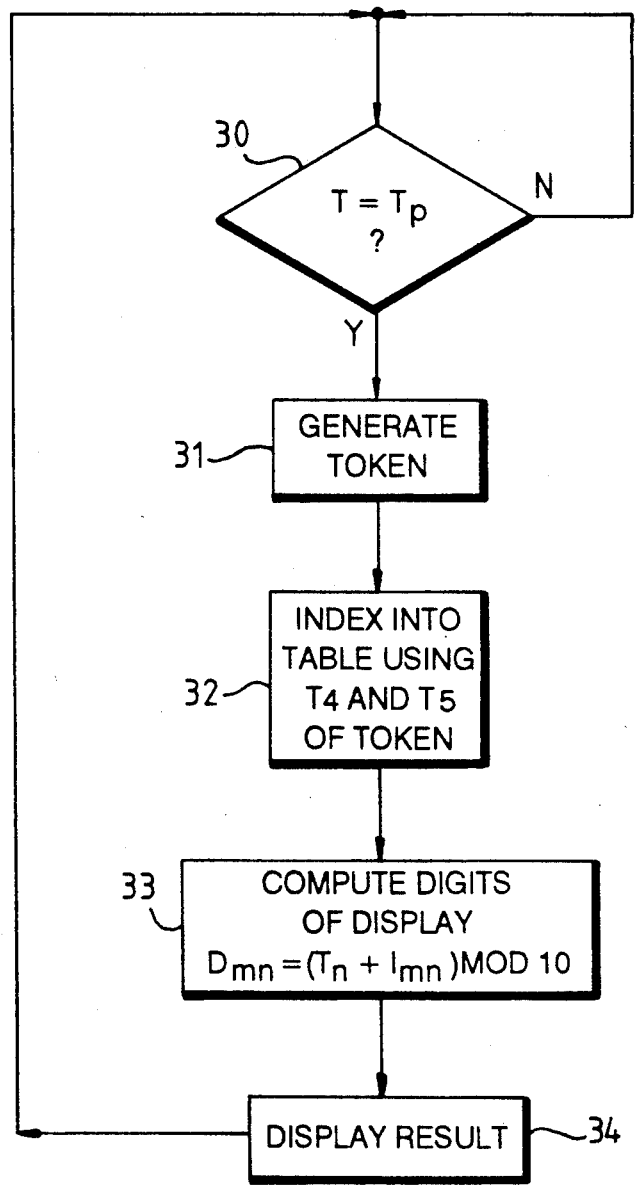
FIG. 5 is a logic flow chart of a program or method implemented in the device of FIGS. 1 and 2 to produce the code as illustrated in FIG. 4.

Referring to FIG. 5, the program implemented by the microcomputer 15 is illustrated according to one embodiment. A time-out is detected by a loop responsive to the number in a counter register (counting pulses from clock 18) being equal a value representing the selected period, indicated by the decision block 30. When time-out occurs, a token 24 is generated using the chosen algorithm, or a table, or the like, indicated by a block 31. The table 25 is then accessed using $T_4$ AND $T_5$ of the token, indicated by block 32. The displayed digits are then calculated using the relationship $D_{mm}=(T_n+I_{mm}) \mod 10$ as discussed above, using the token 24, as represented by the block 33. The result is displayed as indicated by the block 34, and control returns to the timing loop of block 30.

Figure 6:
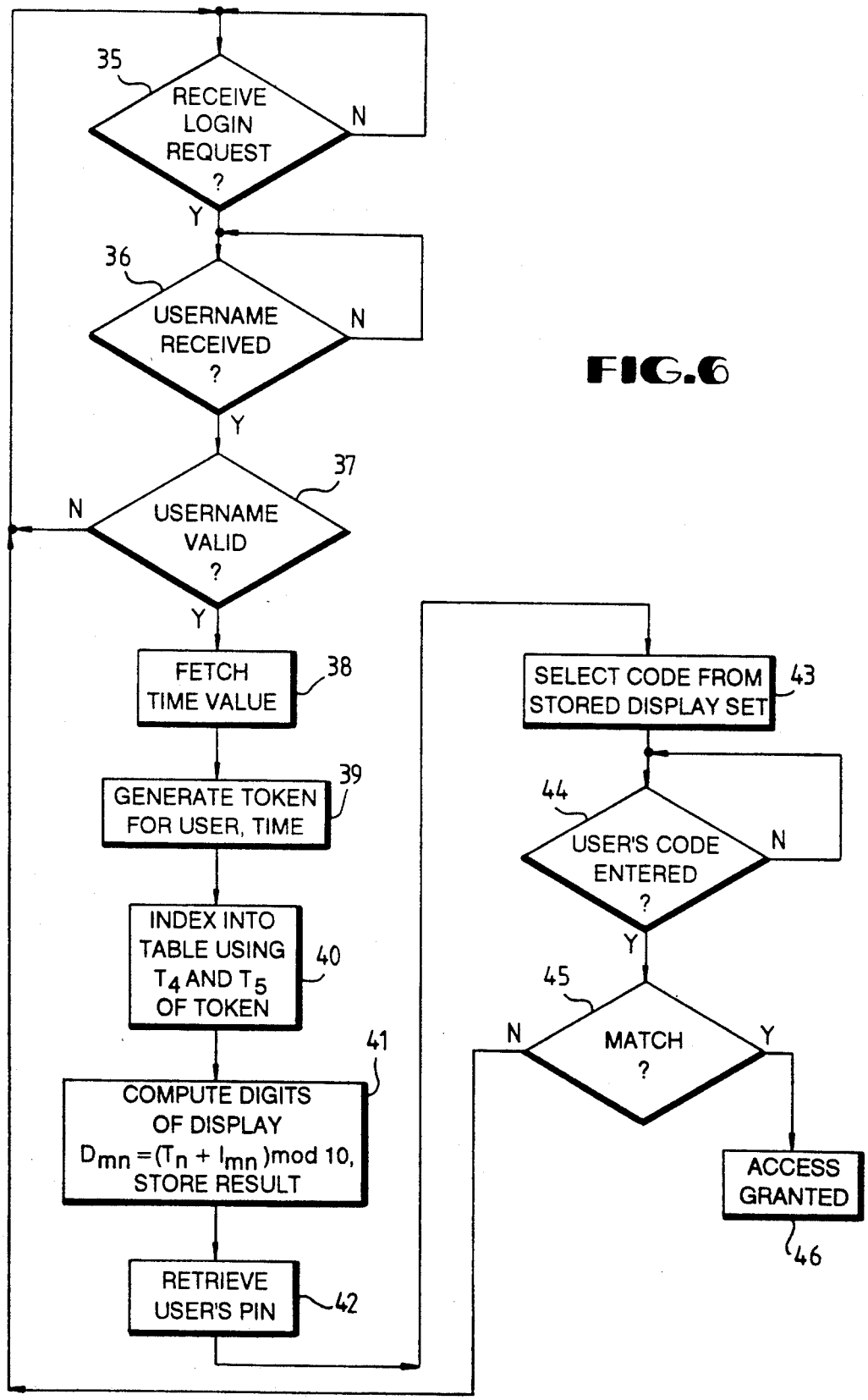
FIG. 6 is a logic flow chart of a program or method implemented in the computer system of FIG. 3 to interpret the codes entered by a user.

Referring to FIG. 6, the security access program implemented by the computer system 21 is shown, for one example. The loop including the block 35 waits for a login request, indicated by whatever action is appropriate, and when a request is invoked then the next step is to wait for a UserName to be entered, indicated by block 36, which may be by a typing in the name, or by a magnetic stripe reader, or by telephone touch-tone, etc., as discussed above. The UserName is checked for validity at block 37, and if not valid control returns to the loop 35. If valid, the time-of-day is retrieved, block 38, and a token is generated in block 39 based on UserName and time, producing the same token 24 as was generated in the device 10 for this user. Next, the same calculation which was done in the device 10, as represented by the blocks 32 and 33 of FIG. 5, is performed in the computer system 21 to generate the field 26 and the resultant display digits; this calculation is represented by the block 40 and 41 of FIG. 6. The user's PIN is retrieved from a store of PINs, usually encrypted, as indicated by the block 42. The code dictated by the UserName, time, token 24, PIN is therefore selected from the equivalent of display 11 (i.e., a table in memory) as indicated by the block 43, and, if the user's code has been received as determined in decision block 44, this calculated code is compared with the actually-received code in decision block 45. Access is granted as indicated by block 46 if the codes match, but if not control returns to the loop 35. Alternatively, to allow for drift in the timekeeping in the device 10, a retry loop may be entered if a match is not found; here the previous and next time periods are tried ($t-1$ and $t+1$) if the real time is near a transition point—the process is re-entered at block 39 in this case. In this alternative, a policy is selected of whether to grant access if it appears the correct code was sent by the user for a just-expired or soon-to-be-entered time period.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method of determining the identity of a user of a computer system, comprising the steps of:

providing a user with a secret ID having a number of characters;

generating in a hand-carried device a token consisting of a number of digits or characters, and displaying a matrix of values derived by an algorithm using said token;

entering into a user terminal of said computer system a sequence of values selected by a user from said matrix based on characters of said ID, to produce a first sequence;

generating in said computer system said sequence of values using said algorithm, to produce a second sequence;

comparing said first and second sequences to thereby establish the identity of said user.

2. A method according to claim 1 wherein said sequence of values is a sequence of digits, said ID is a sequence of digits, and said token is a number of digits.

3. A method according to claim 1 including the step of displaying said matrix in a regular array.

4. A method according to claim 3 wherein said user selects values from said displayed matrix by indexing into said matrix using said characters of said ID.

5. A method according to claim 1 wherein a different said token is generated in said device at regular time intervals, and the same token is generated in said computer system at the same time intervals.

6. A method according to claim 1 including the step of granting access to said computer system for said user if said first and second sequences match.

7. A method according to claim 6 wherein said device is a self-contained unit connected to said computer system.

8. A hand-held computer access security device comprising:

a display producing an array of rows and columns of characters;

a character generator producing a set of characters for said display, said set changing at selected time intervals;

wherein a user of said hand-held device selects from said array a code for entering into a computer system, said selection being based upon character positions corresponding to a secret number known to the user.

9. A device according to claim 8 wherein said characters are decimal digits.

10. A device according to claim 8 wherein the number of characters in said set is much greater than the number of digits in said secret number.

11. A device according to claim 8 wherein said device includes a microcomputer chip as said character generator and for driving said display.

12. A device according to claim 11 wherein said device includes a time reference for generating said time intervals.

13. A device according to claim 8 wherein said set is selected from a number of possible sets stored in said device.

14. A method of generating a code for secured computer access comprising the steps of:

displaying in a hand-held device an array of rows and columns of characters;

generating in said hand-held device a set of characters for said display, and changing said set at selected time intervals;

wherein a user of said hand-held device selects from said array a code for entering into a computer system, said selection being based upon character positions corresponding to a secret number known to the user.

15. A method according to claim 14 wherein said characters are decimal digits.

16. A method according to claim 14 wherein the number of characters in said set is much greater than the number of digits in said secret number.

17. A method according to claim 14 wherein said device includes a microcomputer chip for generating said set of characters and for driving said display.

18. A method according to claim 17 including the step of generating a time reference locally in said device for generating said time intervals.

19. A method according to claim 14 wherein said set is selected from a number of possible sets stored in said device.

* * * * *

UNITED STATES PATENT AND TRADEMARK OFFICE
CERTIFICATE OF CORRECTION

PATENT NO. : 5,177,789
DATED : January 5, 1993
INVENTOR(S) : John Rodney Covert

It is certified that error appears in the above-indentified patent and that said Letters Patent is hereby corrected as shown below:

Column 4, line 35, change "$D_{mm} = (T_n + I_{mm})$" to --$D_{mn} = (T_n + I_{mn})$--.

Column 5, line 12, change "$D_{mm} = (T_n + I_{mm})$" to --$D_{mn} = (T_n + I_{mn})$--.

Signed and Sealed this

Eleventh Day of January, 1994

Attest:

BRUCE LEHMAN

Attesting Officer  Commissioner of Patents and Trademarks